Figures 1, 2:
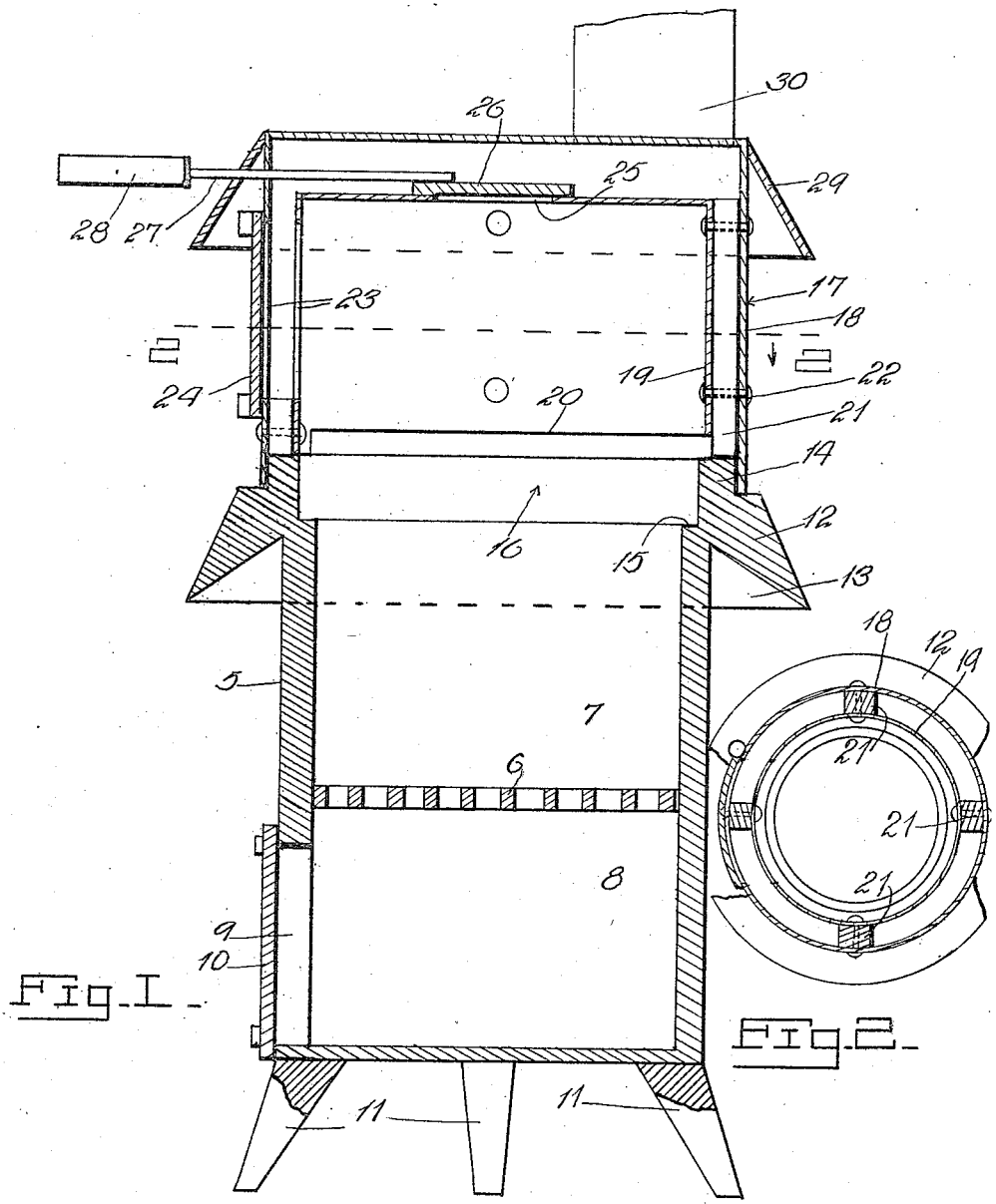

G. G. SCARBOROUGH.
STOVE.
APPLICATION FILED JULY 20, 1918.

1,295,606.

Patented Feb. 25, 1919.

Inventor
G. G. Scarborough
By C. H. Parker
Attorney

UNITED STATES PATENT OFFICE.

GEORGE G. SCARBOROUGH, OF GIRDLETREE, MARYLAND.

STOVE.

1,295,606.

Specification of Letters Patent.   Patented Feb. 25, 1919.

Application filed July 20, 1918.   Serial No. 245,829.

*To all whom it may concern:*

Be it known that I, GEORGE G. SCARBOROUGH, citizen of the United States, residing at Girdletree, in the county of Worcester and State of Maryland, have invented certain new and useful Improvements in Stoves, of which the following is a specification.

My invention relates to improvements in heating stoves, adapted to use coal, wood or the like, as fuel.

Important objects of the invention are to provide a stove of the above mentioned character having means for delivering the maximum amount of heat at a point near the central portion thereof; to provide means for deflecting the heat downwardly; to provide means whereby the heated gases or products of combustion are retarded in their travel in proximity to a heat absorbing and radiating element to increase the heat imparted thereto; and to provide means whereby the several elements of the stove are assembled in a compact and strong manner.

Other objects and advantages of the invention will be apparent during the course of the following description.

In the accompanying drawings forming a part of this specification and in which like numerals are employed to designate like parts throughout the same, Figure 1 is a vertical central sectional view through a stove embodying my invention, and, Fig. 2 is a horizontal sectional view taken on line 2—2 of Fig. 1.

In the drawings, wherein for the purpose of illustration is shown a preferred embodiment of my invention, the numeral 5 designates a casing, constituting the body portion of the stove. This casing has a grate 6, which divides the casing into a fire-box 7 and an ash-pit 8. The ash-pit 8 has an opening 9, covered by a door 10. The casing 5 is supported by legs 11.

Preferably formed integral with the upper end of the fire-box 7 is an annular heat absorbing and radiating element 12, which is approximately V-shaped in cross-section, providing a lower inclined face 13, diverging downwardly. The element 12 has an upstanding annular flange 14, and an inner shoulder 15, providing an enlarged bore 16.

The numeral 17 designates a cover for the body portion 5, including an outer casing 18, closed at its top, and opened at its bottom. The casing 18 receives the flange 14 into the lower end thereof, and is thereby secured to the element 12. Arranged within the casing 18 is an inner casing 19, having its upper end closed and its lower end open. The lower end is cut away, at 20, providing a passage for the products of combustion to escape from the inner casing into the lower end of the outer casing 18. The casings 18 and 19 are arranged in spaced concentric relation and are held in such relation by spaced vertical bars 21, attached thereto by bolts 22 or the like.

At their forward sides, the casings 18 and 19 have openings 23, in registration, for the passage of fuel into the fire-box 7. The outer opening 23 is covered by a door 24, which may be hinged thereto.

The top of the inner casing 19 has a smoke outlet opening 25, adapted to be covered and uncovered by a sliding door or damper 26, attached to a rod 27, carrying a handle 28.

A downwardly diverging inclined heat deflecting flange 29 is rigidly secured to the upper end of the outer casing 18, and a stack 30, leads into the upper end thereof.

In the use of the stove, fuel is passed into the fire-box 7 through the openings 23. The fuel is ignited within the fire-box 7. The products of combustion pass through the passages 20 and 23 into the passage between the casings 18 and 19, which passage is annular. It is thus apparent that the travel of these products of combustion is somewhat retarded, in proximity to the heat absorbing and radiating element 12, thereby causing the same to become heated to a high degree. The products of combustion finally discharge through the stack 30. Particular attention is called to the fact that the diameters of the casings 18 and 19 are substantially greater than that of the fire-box 7, whereby the annular passage between the casings 18 and 19, is arranged outwardly of the fire-box, in proximity to the upper end of the element 12. This causes the heated gases passing through the opening 20 to travel approximately horizontally, in proximity to the element 12, and the cross sectional area of the annular passage being much less than that of the fire-box, the travel of the gases are perceptibly retarded, and hence the maximum degree of heat will be absorbed by the element 12. When wood is used as fuel, it is found advantageous to move the damper 26 to the open position, upon opening the door 24 for introducing additional fuel into the stove. The opening 25 will then permit of the escape of the smoke and products of combustion into and through the stack 30, and prevent the same from passing outwardly through the openings 23.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. A heating stove of the character described, comprising a body portion including a grate with a fire-box above the grate and an ash pit below the grate, an annular heat absorbing and radiating element secured to the upper end of the body portion and extending radially and outwardly beyond the same and having a lower inclined deflecting surface, an outer casing having its upper end closed and its lower end open and secured to the top of the body portion and having a larger bore than the bore of the body portion, an inner casing disposed within the outer casing in spaced concentric relation and having its top closed and its lower end open and having a larger bore than the bore of the body portion with a substantially horizontal passage at its lower end, said substantially horizontal passage extending around the inner casing and being disposed in proximity to the heat absorbing and radiating element and leading into the lower end of the space between the inner and outer casings, and a pipe connected with the upper portion of the outer casing.

2. A heating stove of the character described, comprising a fire-box, a heat absorbing and radiating element carried by the upper portion of the fire-box, inner and outer spaced casings secured to the top of the fire-box and having a passage therebetween, said passage having a diameter substantially greater than the diameter of the fire-box, the inner casing being provided with a substantially horizontal passage surrounding the inner casing and arranged in proximity to the heat absorbing and radiating element, said inner casing being provided in its top with an outlet opening, and a movable member to cover and uncover the outlet opening, and an outlet device connected with the outer casing.

In testimony whereof I affix my signature in presence of two witnesses.

GEORGE G. SCARBOROUGH.

Witnesses:
JAMES L. CRAWFORD,
C. L. PARKER.

Copies of this patent may be obtained for five cents each, by addressing the "Commissioner of Patents, Washington, D. C."